Figure 1:
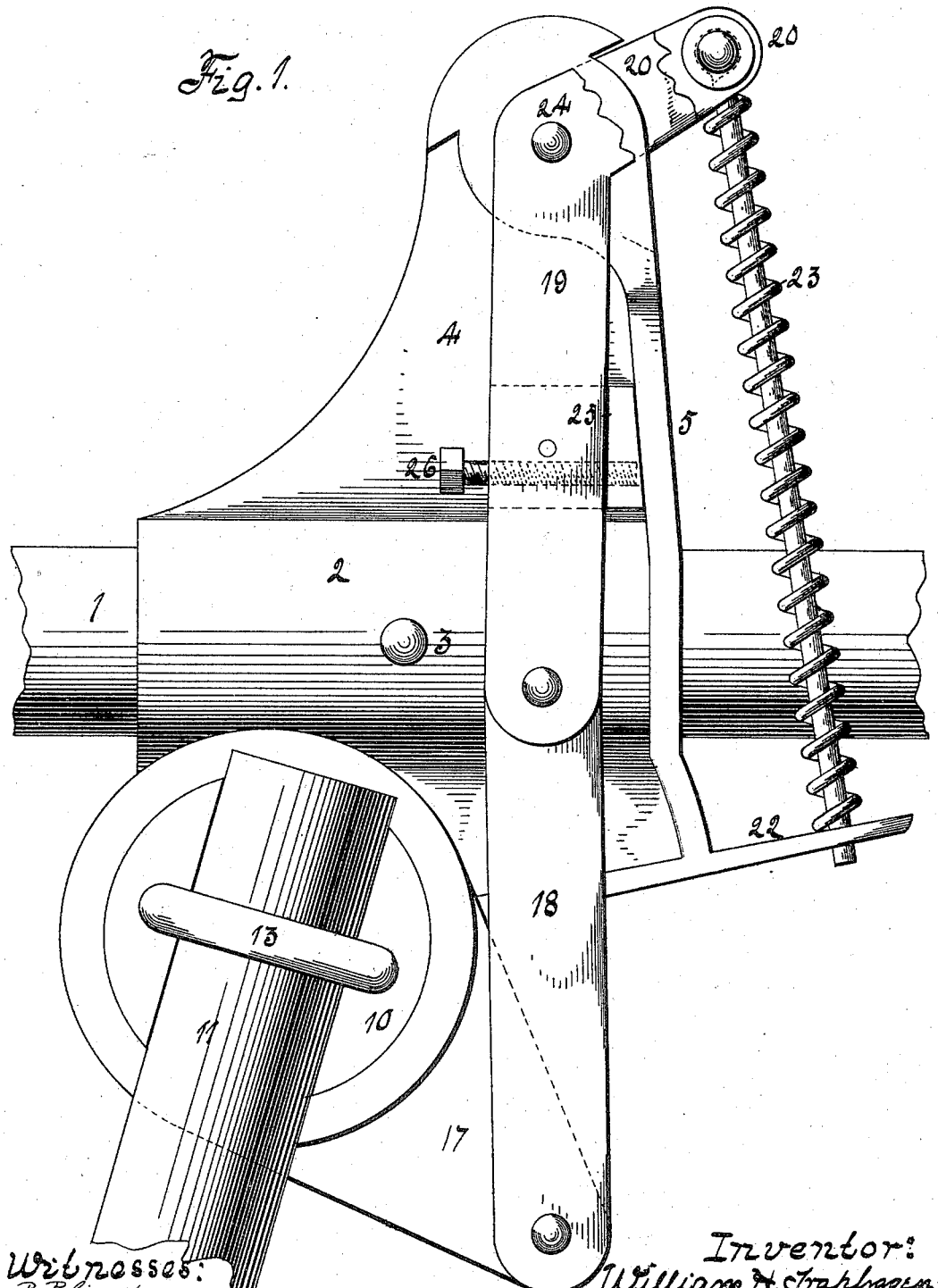

(No Model.)  W. H. TRAPHAGEN.  3 Sheets—Sheet 1.
CULTIVATOR.

No. 581,968.  Patented May 4, 1897.

Witnesses:
B. Blinn
E. Behel.

Inventor:
William H. Traphagen
By A. O. Behel
attys.

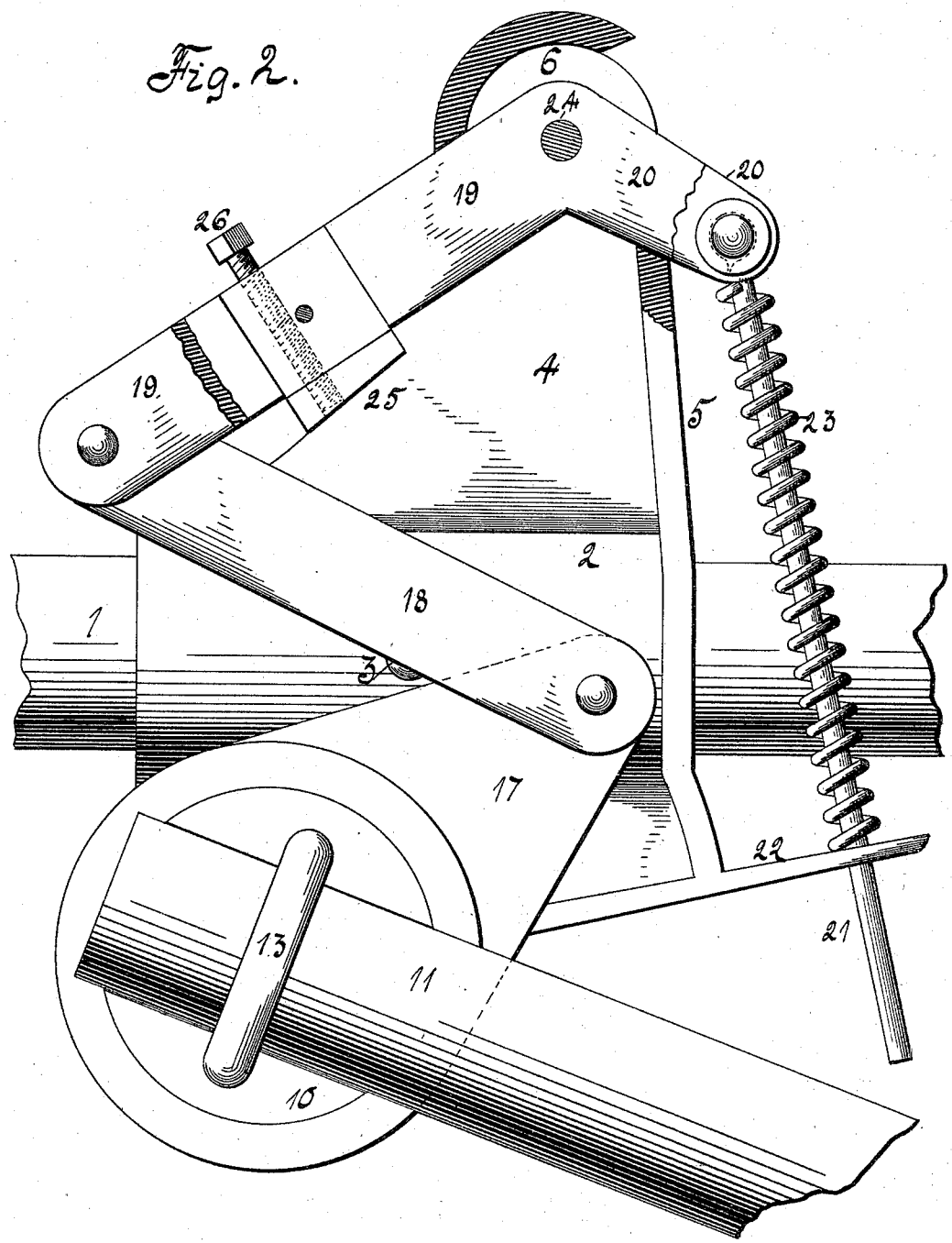

(No Model.)  W. H. TRAPHAGEN.  3 Sheets—Sheet 3.
CULTIVATOR.
No. 581,968.   Patented May 4, 1897.
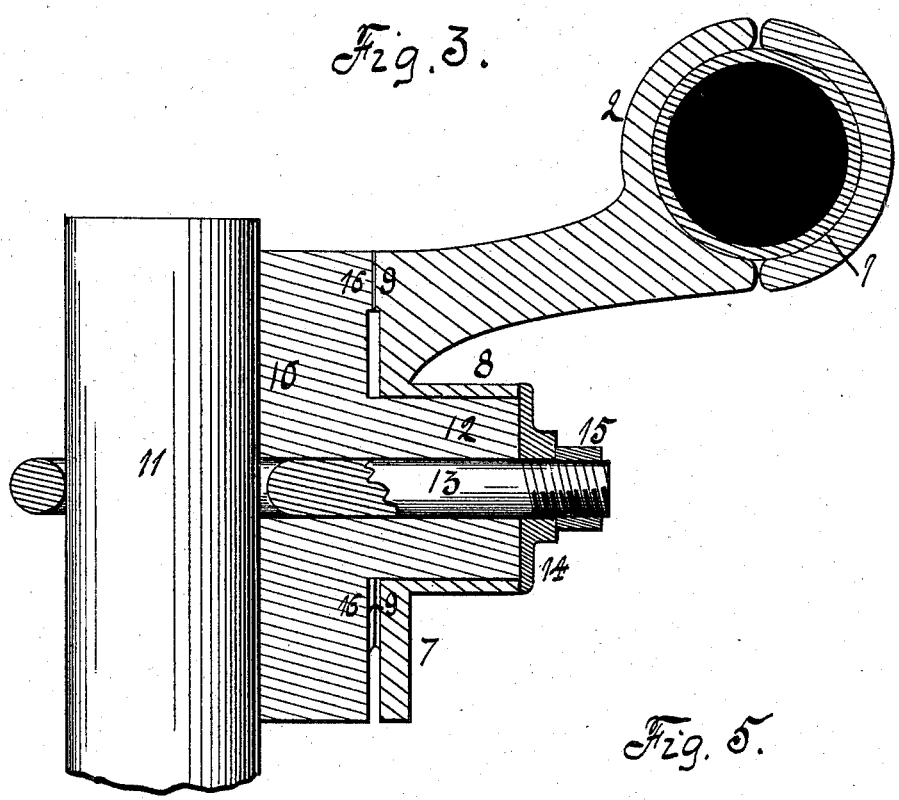
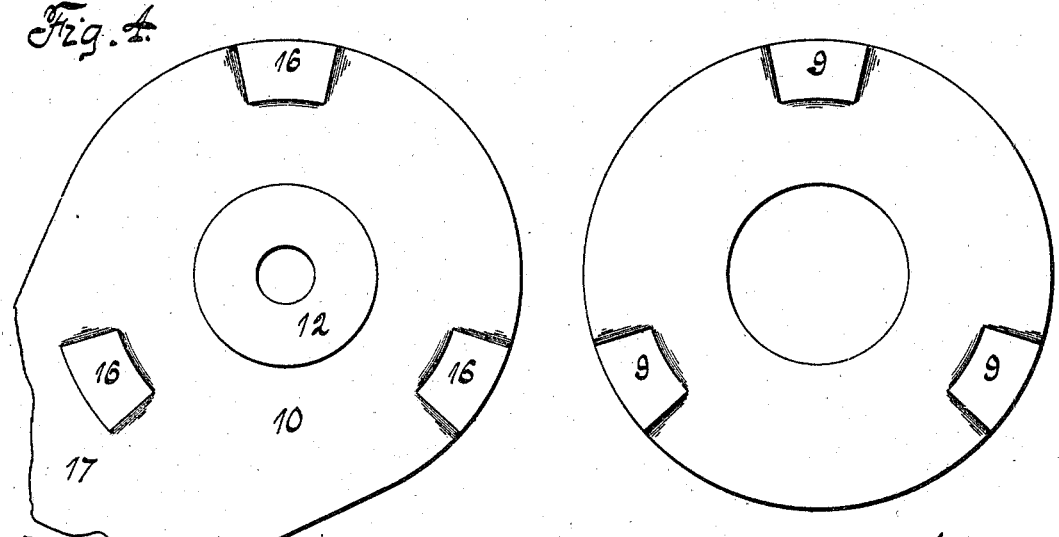
Witnesses:
B. Blind
E. Behel.
Inventor:
William H Traphagen
By A. C. Behel
Attys.

UNITED STATES PATENT OFFICE.

WILLIAM H. TRAPHAGEN, OF ROCKFORD, ILLINOIS, ASSIGNOR TO EMERSON, TALCOTT & CO., OF SAME PLACE.

CULTIVATOR.

SPECIFICATION forming part of Letters Patent No. 581,968, dated May 4, 1897.

Application filed March 11, 1896. Serial No. 582,763. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Cultivators, of which the following is a specification.

The object of this invention is to hold the shovel in working position by spring action through the medium of toggle-levers.

The further object of this invention is to form a frictional engagement between the shovel-standard and its support, whereby after the standard has yielded a short distance it will be released of the frictional contact, permitting the shovel to pass over an obstruction without liability of breakage, and which can be more readily returned to its working position by spring action.

In the accompanying drawings, Figure 1 is a side elevation of a section of drag-bar and the shovel-standard held in working position. Fig. 2 is a similar elevation in which the parts have been moved into a position they might occupy while the shovel was passing over an obstruction. Fig. 3 is a transverse section through the drag-bar and shovel-standard and its support. Figs. 4 and 5 are inner face representations of the standard-socket and its support.

The drag-bar 1 in this instance is of tubular form, to which is connected a bracket 2 by a bolt 3. This bracket has an upward extension or web 4, and its rear edge is provided with a flange 5, extending at right angles to the web. The upper end of the bracket has a recessed portion 6. The lower end 7 of the bracket is in circular form and provided with a hub 8. The flat face of this lower end has three projections 9, located at equal distances. A socket 10, filled to receive a shovel-standard 11, is held in place against the face of the lower end of the bracket 7 by a projection 12, fitted to enter the hub, and an eyebolt 13, surrounding the shovel-standard and passing through the projection, receiving a washer 14 and nut 15 on its end. The inner face of this socket has three projections 16, corresponding to the projection 9 of the bracket, and when the shovel-standard is in working position the projection on the socket rests upon the projection on the bracket, and when the standard is tripped the projection on the socket will be turned clear of the other projections, the eyebolt acting as the pivot upon which it turns, and when the standard is in working position the projections hold it from lateral motion, but when tripped a limited lateral movement is allowed.

From the socket 10 extends an arm 17, to which is pivoted a link 18, and to the free end of this link is pivoted one end of a double link composed of bars 19, having an angular extension 20, between the ends of which is pivoted a rod 21, having its free end passing through an opening in an arm 22, extending from the bracket 2. A spiral spring 23 surrounds this rod, one end resting upon the upper face of the arm and against the under face of the angular extensions. One of the arms of this double link is placed within the recess in the upper end of the bracket and the other arm on the outside. A bolt or pin 24 holds the parts together in a pivotal manner. Between the arms of this double link is secured a stop-block 25, through which a set-screw 26 passes. This double link and single link form a toggle-lever connection between the shovel-standard and bracket secured to the drag-bar, and the spring acting upon the toggle-levers exerts its influence upon the shovel.

When the parts are in the position shown at Fig. 1, it will be noticed that the pivotal connection between the arms forming the toggle-levers is in advance of their pivotal connection with the bracket and socket, and such relation is retained by the stationary stop 25 engaging the flange 5, and this is the working position of the parts. Should the shovel attached to the shovel-standard encounter an obstruction, the standard will turn upon its pivotal connection, with the bracket carrying the arm to which the single link is connected, and this will cause the double link to move upon its pivotal connection with the bracket and compress the spiral spring, when the parts will appear as shown at Fig. 2. After the obstruction has been passed the action of the spiral spring upon the toggle-levers will return the shovel-standard to its working position.

It will be noticed that I have employed a stationary stop to limit the greatest extent of the lock of the toggle-levers. This is to prevent the attendant from increasing the lock and possibly breaking the parts. Should less lock be desirable, the set-screw 26 is turned in to engage the flange 5 to give the lock necessary. It will also be noticed that in breaking the lock I have arranged the toggle-levers and their connections so that the slightest movement of the shovel-standard will cause the stop to move from engagement with the flange without first increasing the lock, as in other cultivators.

By the employment of the projections between the meeting faces of the shovel-standard socket and its bracket-support when the parts are in their working position these projections will come in contact, thereby forming a rigid connection, but as the shovel encounters an obstruction the projections on the socket will move clear of the projection on the bracket, thereby leaving the standard free to pass over the obstruction without danger of breaking the parts, and the force of the spring will bring the parts to their working position.

I claim as my invention—

1. In a cultivator, the combination of a shovel-standard, a support therefor, an arm extending from the support, a single link and a double link, pivotally connected to each other and to the arm, and stationary support, one of the links having an extension, a rod having a pivotal connection with the extension, a spiral spring surrounding the rod having one end resting against a stationary support and its other end against the extension, and a stop limiting the extent of the lock of the links.

2. In a cultivator, the combination of a shovel-standard socket and its support, each provided with projections on their inner faces.

3. In a cultivator, the combination of a shovel-standard socket and its support, each provided with projections on their inner faces, and a screw-threaded eyebolt holding a shovel-standard, its support and socket together.

WILLIAM H. TRAPHAGEN.

Witnesses:
   H. R. TRAPHAGEN,
   A. O. BEHEL.